(12) United States Patent
Bent

(10) Patent No.: US 8,112,430 B2
(45) Date of Patent: Feb. 7, 2012

(54) SYSTEM FOR MODIFYING A RULE BASE FOR USE IN PROCESSING DATA

(75) Inventor: Graham Anthony Bent, Bitterne (GB)

(73) Assignee: International Business Machines Corporation, Armonk, NY (US)

( * ) Notice: Subject to any disclaimer, the term of this patent is extended or adjusted under 35 U.S.C. 154(b) by 1230 days.

(21) Appl. No.: 11/550,939

(22) Filed: Oct. 19, 2006

(65) Prior Publication Data

US 2007/0094282 A1   Apr. 26, 2007

(30) Foreign Application Priority Data

Oct. 22, 2005 (GB) .................................. 0521544.7

(51) Int. Cl.
*G06F 7/00* (2006.01)

(52) U.S. Cl. .................................... 707/755; 717/143
(58) Field of Classification Search ........................ None
See application file for complete search history.

(56) References Cited

U.S. PATENT DOCUMENTS

| | | | | |
|---|---|---|---|---|
| 5,652,897 | A * | 7/1997 | Linebarger et al. | 704/4 |
| 5,708,805 | A * | 1/1998 | Okamoto et al. | 1/1 |
| 5,815,152 | A * | 9/1998 | Collier et al. | 715/839 |
| 5,819,265 | A * | 10/1998 | Ravin et al. | 1/1 |
| 6,006,242 | A * | 12/1999 | Poole et al. | 715/209 |
| 6,092,059 | A * | 7/2000 | Straforini et al. | 706/14 |
| 6,108,620 | A * | 8/2000 | Richardson et al. | 704/9 |
| 6,336,094 | B1 * | 1/2002 | Ferguson et al. | 705/35 |
| 6,714,941 | B1 * | 3/2004 | Lerman et al. | 1/1 |
| 7,058,567 | B2 * | 6/2006 | Ait-Mokhtar et al. | 704/9 |
| 2003/0046297 | A1 | 3/2003 | Mason | |
| 2003/0074187 | A1 * | 4/2003 | Ait-Mokhtar et al. | 704/9 |
| 2003/0144978 | A1 | 7/2003 | Zeine | |
| 2003/0196195 | A1 * | 10/2003 | Sluiman | 717/143 |
| 2004/0019874 | A1 * | 1/2004 | Edwards et al. | 717/106 |
| 2005/0165600 | A1 * | 7/2005 | Kasravi et al. | 704/9 |
| 2006/0253273 | A1 * | 11/2006 | Feldman et al. | 704/9 |
| 2006/0288268 | A1 * | 12/2006 | Srinivasan et al. | 715/505 |

OTHER PUBLICATIONS

Delisle, S et al, "Experiments with learning parsing heuristics", Proc. 36th annual meeting of Association for Computational Linguistics—vol. 1, p. 307-313 (1998).

* cited by examiner

*Primary Examiner* — Tuan Dam
*Assistant Examiner* — Samuel Hayim
(74) *Attorney, Agent, or Firm* — Fox Rothschild, LLP; Robert J. Sacco

(57) ABSTRACT

A system for modifying a rule base for use in processing data, wherein an instance of an entity comprises associated data, for use with a parser for identifying a first instance of an entity in data associated with a document set in accordance with a first rule and for using the first instance of the entity to identify a second instance of the entity in the data associated with the document set. The system comprises an accessor for accessing data associated with the second instance of the entity; and a generator for using the data associated with the second instance of the entity to generate a second rule.

37 Claims, 3 Drawing Sheets

SYSTEM FOR MODIFYING A RULE BASE FOR USE IN PROCESSING DATA

FIELD OF THE INVENTION

The present invention relates to a system for modifying a rule base for use in processing data.

BACKGROUND OF THE INVENTION

Parsing of unstructured documents to create data that can be stored in a structured form is a well established technique. However no parser is perfect and therefore essential data may still be embedded within a document that the parser has failed to discover.

Parsers are typically used to identify entities of specific types occurring within documents. An example of such a parser is one that extracts an entity type, such as, a person (wherein "a person" is the entity type and "John Smith" is an example of an entity), an organisation etc. using some form of rule.

For example a rule that specifies "at least a first and second word beginning with a capital letter followed by "lives in a house"" can be used to identify a name associated with a person entity in a particular document e.g. John Smith lives in a house. Note that simply searching for keywords (e.g. John Smith) is not satisfactory, since the keywords will not find any other person entity in the document (e.g. Joe Bloggs).

However, the same rule will not identify the same name in another context elsewhere in the same document or in another document. For example wherein the context is "is a scientist"—i.e. John Smith is a scientist. Thus, another rule is required to identify the entity in this context.

A prior art solution to this problem is to provide for manual identification of missed entities and then to update a rule set with a rule that can find the missed entity. Disadvantageously, this is an overhead and also, a user undertaking manual identification can make errors by creating a rule that incorrectly identifies an entity (e.g. an entity of an entity type person is identified as an entity type of organisation).

Another prior art solution is to use a database of known entities (e.g. a database of known names) to identify an entity in a document. However, disadvantageously, creating a database of known entities is a very laborious task and needs continual maintenance (e.g. for updates, deletion etc.).

DISCLOSURE OF THE INVENTION

According to a first aspect there is provided a system for modifying a rule base for use in processing data, wherein an instance of an entity comprises associated data, for use with a parser for identifying a first instance of an entity in data associated with a document set in accordance with a first rule and for using the first instance of the entity to identify a second instance of the entity in the data associated with the document set, the system comprising: an accessor for accessing data associated with the second instance of the entity; and a generator for using the data associated with the second instance of the entity to generate a second rule.

Preferably, the second instance of the entity matches the first instance of the entity. More preferably, the second instance of the entity substantially matches the first instance of the entity. Still more preferably, the data associated with the document set comprises a text index.

In a preferred embodiment, the data associated with the instance of the entity comprises at least one of: a rule identifier associated with a rule used to identify the instance of the entity; an entity type; a document identifier associated with a document in which the instance of the entity was identified; a location identifier associated with a location in the document at which the instance of the entity was identified; a length value associated with a length of the entity. Preferably, the system further comprises an extractor for using the data associated with the second instance of the entity to extract a set of the data associated with the document set. More preferably, the generator uses the extracted set of the data to generate the second rule.

Preferably the system further comprises an evaluator for evaluating at least one rule by using the data associated with an instance of the entity. More preferably the evaluator evaluates at least one rule by using data associated with at least one other rules. Still more preferably the evaluator evaluates at least one rule by using data associated with a plurality of other rules.

In a preferred embodiment, the evaluator determines whether the at least one rule meets a threshold associated with selection of a rule. Preferably, the system further comprises a selector for selecting, in response to a determination that the at least one rule meets the threshold, the at least one rule. More preferably, the system further comprises a ranker for ranking, in response to a determination that the at least one rule meets the threshold, the at least one rule.

According to a second aspect, there is provided a method for modifying a rule base for use in processing data, wherein an instance of an entity comprises associated data, for use with a parser for identifying a first instance of an entity in data associated with a document set in accordance with a first rule and for using the first instance of the entity to identify a second instance of the entity in the data associated with the document set, the method comprising the steps of: accessing data associated with the second instance of the entity; and using the data associated with the second instance of the entity to generate a second rule.

According to a third aspect, there is provided a computer program product comprising program code means adapted to perform all the steps of the method described above, when said program is run on a computer.

It should be understood that a rule can comprise a number of formats. For example, in a first rule "is known that*works for himself". "*" represents a wildcard to allow a text portion to match the rule if the text portion comprises the sub-portions located on either side of the wildcard. In another example, a rule can be a heuristic rule. For example, a first heuristic rule identifies a person entity and comprises a portion of text representing the entity (e.g. two sequential capitalised words), two portions of text comprising three words located on either side of the two sequential capitalised words and no punctuation.

If a rule base comprises a first rule, preferably, a new rule is evaluated against the first rule and vice versa. If the new rule is added to the rule base as a second rule, preferably, a further new rule is evaluated against the first rule and the second rule (and preferably, the first rule is evaluated against the second rule and the further new rule and the second rule is evaluated against the first rule and the further new rule). Advantageously, as further rules are added to the rule base, evaluation of a rule preferably occurs against these rules. Evaluation of a rule benefits from evaluation against a cumulative rule base allowing for evolutionary evaluation of rules (i.e. in accordance with the addition of more data in the form of rules to the rule base).

BRIEF DESCRIPTION OF THE DRAWINGS

The present invention will now be described, by way of example only, with reference to preferred embodiments thereof, as illustrated in the following drawings.

DETAILED DESCRIPTION OF THE PREFERRED EMBODIMENT

Figure 1:
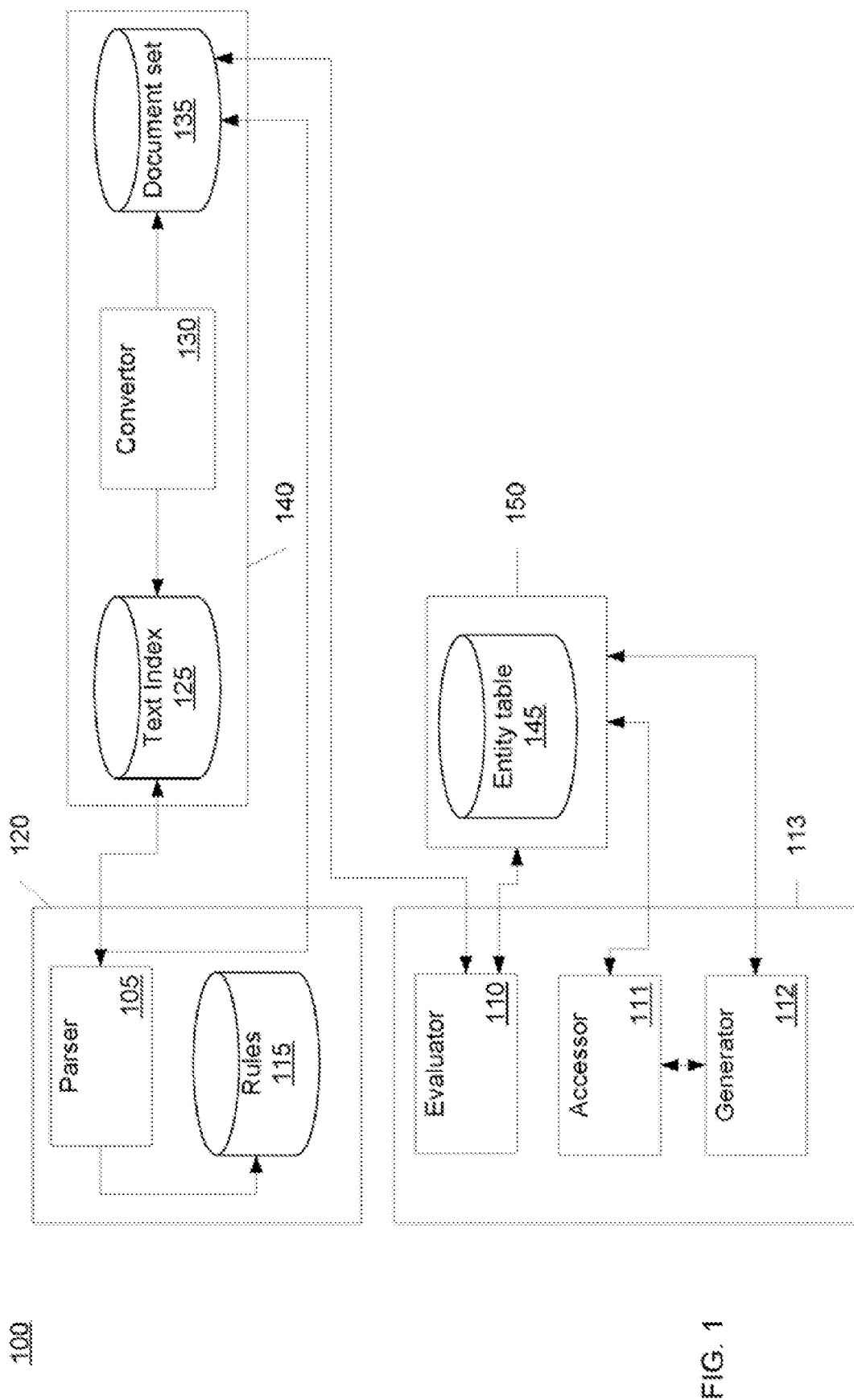
FIG. 1 is a block diagram of a system in which the preferred embodiment is implemented.

The present invention will now be described with reference to the FIGs. FIG. 1 is a block diagram of a system (100) in which the preferred embodiment may be implemented.

The system (100) comprises a parser (105) executing on a local data processing system (120) for identifying specific types of entities in a document set (135). In the preferred embodiment, the document set (135) resides on a first remote data processing system (140). Alternatively the document set (135) can reside on the local data processing system (120) associated with the parser (105).

The parser (105) is executed against data associated with a document set (135), for example, against the document set (135) itself, or against a text index (125) of the document set (135), wherein the text index (125) is generated by a converter (130). The converter (130) analyses at least one text string in a document and tokenises the at least one text string into one or more tokens (i.e. wherein a token is a string of characters such as a word). Canonical forms of the tokens can also be optionally created. Preferably, each document is indexed by a document identifier and further indexed by token, a location in the document associated with the token and the length of the token.

The system (100) also comprises a rule base (115) comprising one or more rules. Preferably, each rule identifies at least one entity of an entity type. More preferably, the rule base (115) comprises at least one rule for each entity type in the document set (135). Still more preferably, a rule identifies a plurality of different entities of an entity type.

The parser (105) utilises a rule in a rule base (115) against the data associated with the document set (135) to find an entity. In response to finding an entity in a document, the parser (105) stores data associated with the entity in an entity table (145). In the preferred embodiment, the entity table (145) resides on a second remote data processing system (150). Alternatively, the entity table (145) can reside on the local data processing system (120) associated with the parser (105).

Preferably, in response to execution of the parser (105), an evaluator (110) evaluates at least one rule to evaluate the efficacy of the at least one rule in determining an entity of a particular entity type. Preferably, the evaluator (110) evaluates the at least one rule in accordance with entity data. More preferably, the evaluator (110) evaluates the at least one rule in accordance with existing rules. In the preferred embodiment, the evaluator (110) resides on a third remote data processing system (113). Alternatively, the evaluator (110) can reside on the local data processing system (120) associated with the parser (105).

In response to the evaluation, for an entity found with a rule, the parser (105) searches the text index (125) to determine a further occurrence of that entity in the document set (135) that is not determined by utilisation of the rule. In response to determining a further occurrence of an entity, the parser (105) stores entity data associated with the further occurrence of the entity.

An accessor (111) accesses the entity data associated with the further occurrence of the entity and a generator (112) uses the entity data associated with the further occurrence of the entity to generate a new rule. In the preferred embodiment, the accessor (111) and generator (112) reside on the third remote data processing system (113). Alternatively, the accessor (111) and generator (112) can reside on the local data processing system (120) associated with the parser (105).

The parser (105) is re-executed to utilise the new rule. In response to the re-execution the evaluator (110) evaluates the new rule.

A process of the preferred embodiment will now be described with reference to the FIGs. With reference to FIG. 2A, the parser (105) accesses the rule base (115) to access (step 200) a rule (e.g. a rule configured by a user, a system etc.) that identifies at least one occurrence of an entity. In a first example, the parser (105) accesses a rule comprising a portion of text having a sequence of capitalised words (denoting an entity of type PERSON) and an associated specific sub-portion of text associated with the capitalised words. The rule is shown below.

Rule 1:

<is> <known> <that> <capitalised word> <capitalised Word> <works> <for> <himself>

The parser (105) compares the rule against data associated with the document set (135) to determine an entity. Specifically, the parser (105) searches for examples of text portions in the document set (135) that match the rule.

In response to the comparison, the parser (105) makes a determination (step 205) as to whether an entity has been found. If an entity is not found, the parser (105) makes (step 215) a determination as to whether there is another rule in the rule base (115). In response to a determination that there is another rule in the rule base (115), the parser (105) accesses (step 200) the another rule and the process repeats. In response to a determination that there is not another rule in the rule base (115), the process ends.

If an entity is found, the parser (105) stores (step 210) entity data associated with the entity (termed herein "entity data") in the entity table (145). The parser (105) makes (step 215) a determination as to whether there is another rule in the rule base (115) as described above.

In the first example, in response to the comparison, the parser (105) finds a matching text portion in a first document, wherein the matching text portion is shown below:

"It is known that Joe Bloggs works for himself on Saturday."

Thus, the parser (105) identifies "Joe Bloggs" as an entity of type PERSON, by utilisation of Rule 1.

In response to finding the entity, the parser (105) stores (step 210) data associated with the entity (termed herein entity data) in the entity table (145). The entity data comprises: an identifier associated with a rule(s) utilised to find the entity; the entity type; the entity; an identifier associated with the document(s) in which the entity is found; the location(s) of the entity in the document(s) and the length of the entity. A representation of the entity table is shown below.

Entity Table:

| RULE ID | ENTITY TYPE | ENTITY | DOCUMENT ID | LOCATION | LENGTH |
|---|---|---|---|---|---|
| R1 | PERSON | Joe Bloggs | 12345 | 10,125 | 10 |

At step 215, the parser (105) makes a determination as to whether there is another rule in the rule base (115). In the first example, the parser (105) finds another rule (i.e. R2) in the rule base (115) and thus the process is repeated.

When the parser (105) has compared all rules In the rule base (115) to the data associated with the document set (135), the process ends.

An example of a resulting entity table is shown below.
Entity Table:

| RULE ID | ENTITY TYPE | ENTITY | DOCUMENT ID | LOCATION | LENGTH |
|---|---|---|---|---|---|
| R1 | PERSON | Joe Bloggs | 12345 | 10,125 | 10 |
| R2 | ORGANISATION | IBM | 23456 | 5,2345 | 3 |
| R2 | ORGANISATION | ACME CORP | 12345 | 11,342 | 9 |
| R3 | PLACE | London | 234 | 35 | 6 |
| R4 | PERSON | John Smith | 2345 | 1,234 | 10 |

With reference to FIG. 38, to prevent the generation of a rule that incorrectly identifies an entity type associated with an entity (e.g. wherein "Joe Bloggs" is incorrectly associated with an entity type of "place"), the evaluator evaluates (step 310) the rules.

Preferably, the evaluator (110) uses the entity data to calculate statistics associated with a rule. More preferably, the evaluator (110) uses data associated with another rule to calculate statistics associated with a rule.

Preferably the evaluator (110) uses a count to evaluate a rule. Examples of a count comprise: the number of entities identified (N1) by each rule; the number of other rules identifying the same entity type (N2); and the number of rules identifying the entity as another entity type (N3).

Preferably, a rule fulfils a condition threshold. Examples of a condition comprise: Condition 1 specifies that a rule identifies a plurality of entities (N1>>1); Condition 2 specifies that the rule is supported by at least one other rule that identifies the same entity type (N2>1) and Condition 3 specifies that the rule is not in conflict with at least one other rule that identifies the entity as another entity type (N3=0).

Preferably, a determination (step 315) is made as to whether a rule should be kept in the rule base (115) or deleted from the rule base (115). Alternatively, a rule can be modified (e.g. by combining the rule with another rule, by generalising the rule etc.). In one example a determination is made by further determining whether a rule meets the condition threshold. For example, a rule that satisfies the condition threshold is selected by a selector (not shown) and remains (step 320) in the rule base (115). A rule that does not satisfy the condition threshold is deleted (step 325) by the selector from the rule base (115).

In the first example, the condition threshold is "1". For example, Rule 1 meets the condition threshold, that is, Rule 1 satisfies one condition, i.e. Condition 3, since Rule 1 is not in conflict with any other rule that identifies Joe Bloggs as another entity type (e.g. a place). Thus, Rule 1 remains (step 320) in the rule base (115).

Preferably, a ranker (rot shown) ranks rules against the condition threshold. Thus for example, a first rule that meets two conditions is more highly ranked by the ranker than a second rule that meets one condition. Preferably, a rule that meets a ranking threshold (e.g. "2") is maintained by the selector in the rule base. Thus, the first rule meets the ranking threshold and is maintained by the selector in the rule base. The second rule does not meet the ranking threshold and is deleted by the selector from the rule base.

Figure 2A:
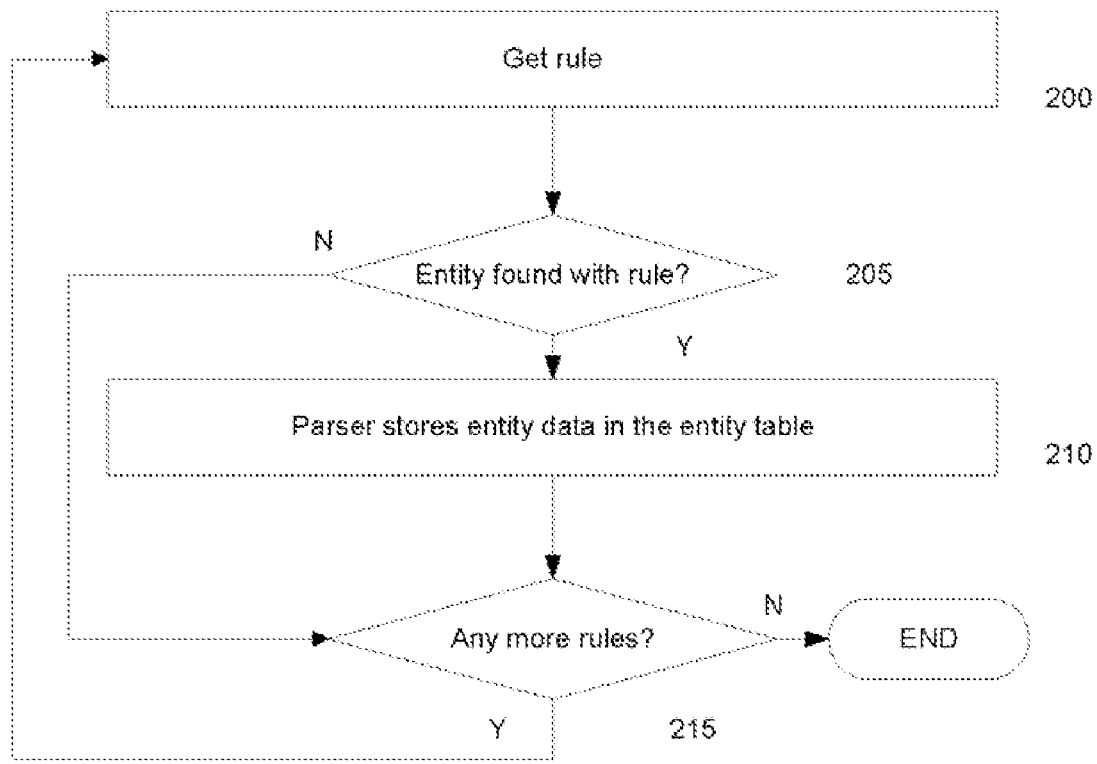
FIGS. 2A & 2B are flow charts showing the operational steps involved in processes executed by a parser.
Figure 2B:
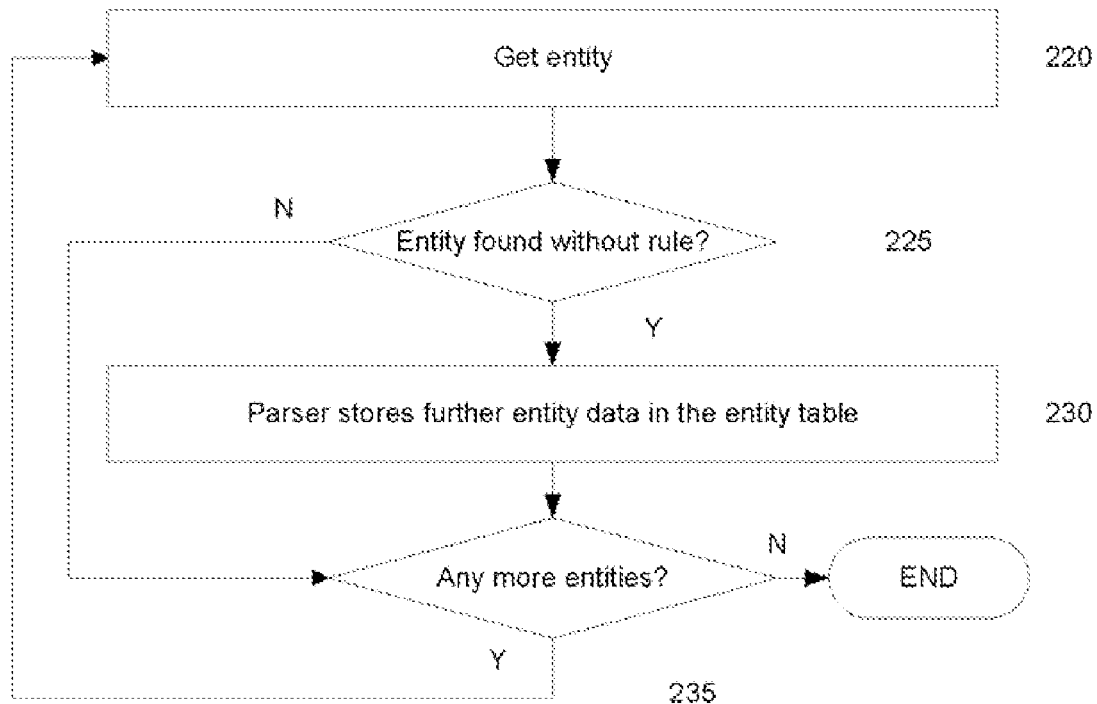

In response to the evaluation with reference to FIG. 2B, the parser (105) accesses (step 220) an entity in the entity table (145) found by utilisation of a ruled The parser compares the entity against data associated with the document set (135), preferably the text index (125), to determine (step 225) a further occurrence of the entity in the document set (135) that was not determined by utilisation of the rule. It should be understood that the further occurrence of the entity can match the previous occurrence of the entity. Alternatively, the further occurrence of the entity can substantially match the previous occurrence of the entity.

In response to not determining a further occurrence of an entity, the parser (105) makes (step 235) a determination as to whether there is another entity in the entity table (145). In response to a determination that there is another entity in the entity table (145), the parser (105) accesses (step 220) the another entity and the process repeats. In response to a determination that there is not another entity in the entity table (145) the process ends.

In response to determining a further occurrence of an entity, the parser (105) stores (step 230) entity data associated with the further occurrence of the entity (termed herein "further entity data") in the entity table (145). The parser (105) makes (step 235) a determination as to whether there is another entity in the entity table (145) as described above.

In the first example the parser (105) accesses (step 220) the entity "Joe Bloggs" and compares the entity against the text index (125). The parser (105) determines (step 225) that a further occurrence of "Joe Bloggs" has been found Thus, the parser (105) stores (step 230) further entity data associated with the further occurrence of "Joe Bloggs" in the entity table (145). An identifier associated with a rule is not applicable, since a rule was not used to find the entity and thus, the value "null" is entered in the "RULE ID" field. It should be understood that the parser (105) preferably assigns the entity type of the previous occurrence of "Joe Bloggs" to the further occurrence of "Joe Bloggs" (i.e. the entity type of PERSON) A representation of the entity table is shown below.
Entity Table:

| RULE ID | ENTITY TYPE | ENTITY | DOCUMENT ID | LOCATION | LENGTH |
|---|---|---|---|---|---|
| R1 | PERSON | Joe Bloggs | 12345 | 10,125 | 10 |
| R2 | ORGANISATION | IBM | 23456 | 5,2345 | 3 |
| R2 | ORGANISATION | ACME CORP | 12345 | 11,342 | 9 |
| R3 | PLACE | London | 234 | 35 | 6 |
| R4 | PERSON | John Smith | 2345 | 1,234 | 10 |
| Null | PERSON | Joe Bloggs | 12345 | 9,527 | 10 |

The parser (105) makes a determination (step 235) as to whether there is another entity in the entity table (145). In the first example, the parser (105) makes a determination that there is another entity in the entity table (145) (that is, "IBM") and the parser (105) accesses (step 220) the another entity and the process repeats. The process repeats until there are no more entities in the entity table (145). In the first example, no further occurrences of the remaining entities are found and thus, the process ends.

Figure 3A:
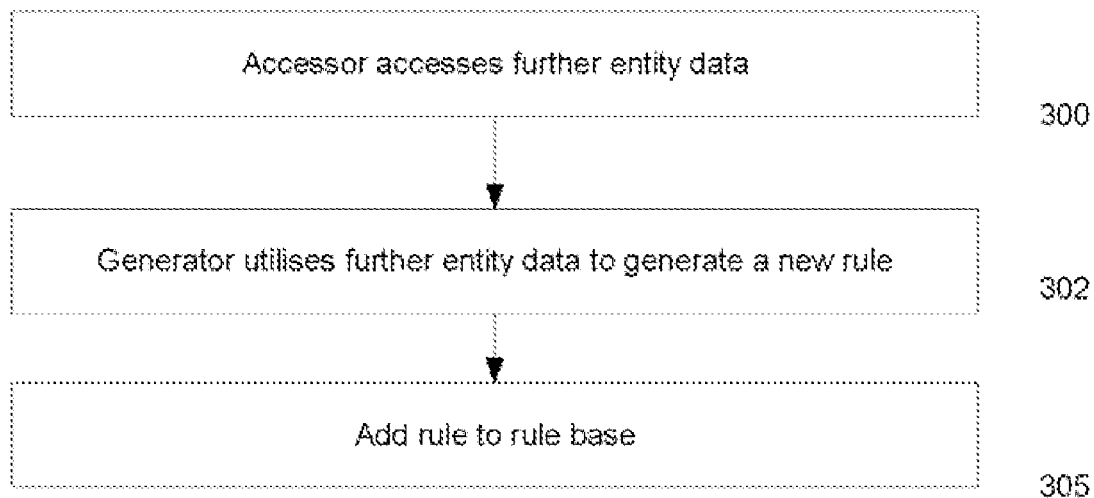
FIG. 3A is flow chart showing the operational steps involved in processes executed by an accessor and a generator.

Preferably, in response to determining a further occurrence of an entity, the parser (105) invokes the accessor (111). With reference to FIG. 3A, the accessor (111) accesses (step 300) further entity data from the entity table (145). An extractor (not shown) utilises the further entity data to extract a portion of text associated with the further occurrence of the entity from the document identified by the further entity data. The size of the portion of text associated with the further occurrence can be pre-configured (e.g. by an administrator, a system etc.).

In the first example, the accessor (111) accesses (step 300) further entity data associated with the entity "Joe Bloggs" from the entity table (145). The extractor utilises the further entity data to extract a portion of text associated with the further occurrence of the entity "Joe Bloggs" from the document (i.e. 12345) identified by the further entity data. In the first example, the following portion of text is extracted:

"The employee is Joe Bloggs and he works in a shop."

The generator (112) utilises (step 302) the extracted sub-portion to generate a new rule. The size of the sub-portion can be pre-configured (e.g. by an administrator, by a system etc.). The sub-portion is shown below "<the> <employee> <is> <capitalised word> <capitalised word> <and> <he> <works>"

The sub-portion above represents a new rule. An assignor (not shown) assigns a unique identifier to the rule (e.g. "R5" representing Rule 5). Preferably, an associator (not shown) associates an entity type with the rule. In the first example, the entity type associated with the rule is an entity type associated with the previous occurrence of the entity, namely, the entity type of PERSON. Alternatively, an entity type is not associated with the rule until evaluation (step 310) is carried out.

The generator (112) adds (step 305) the rule to the rule base (115), causing the parser (105) to update to the entity table (145). A representation of the entity table is shown below.

Entity Table:

| RULE ID | ENTITY TYPE | ENTITY | DOCUMENT ID | LOCA-TION | LENGTH |
|---|---|---|---|---|---|
| R1 | PERSON | Joe Bloggs | 12345 | 10,125 | 10 |
| R2 | ORGANI-SATION | IBM | 23456 | 5,2345 | 3 |
| R2 | ORGANI-SATION | ACME CORP | 12345 | 11,342 | 9 |
| R3 | PLACE | London | 234 | 35 | 6 |
| R4 | PERSON | John Smith | 2345 | 1,234 | 10 |
| R5 | PERSON | Joe Bloggs | 12345 | 9,527 | 10 |

The addition of the rule to the rule base (105) causes a re-execution of the parser (105).

Preferably data associated with an entity in the entity table that is frequently identified as being of the same entity type (e.g. wherein an entity "Joe Bloggs" is identified as an entity type of PERSON) is accessed by the accessor (111) (and therefore used to generate a new rule) The entity can be identified in accordance with a pre-configured threshold frequency. Thus, data associated with an entity that is not frequently identified as being of the same entity type (e.g. wherein an entity "Jane Jones" is identified as an entity type of PERSON and ORGANISATION), is preferably not accessed by the accessor (111).

With reference to FIG. 2A, the parser (105) accesses the rule base (115) to access (step 200) the new rule. The rule is shown below.

Rule 5:

"<the> <employee> <is> <capitalised word> <capitalised word> <and> <he> <works>"

The parser (105) compares the rule against data associated with the document set (135) to determine an entity. In response to the comparison, the parser (105) makes a determination (step 205) as to whether an entity has been found. If an entity is not found, the parser (105) makes (step 215) a determination as to whether there is another rule in the rule base (115) as described above.

In the first example, in response to the comparison, the parser (105) finds a matching text portion in a second document, wherein the matching text portion is shown below:

"The employee is Tom Bryant and he works in a city."

Thus, the parser (105) identifies "Tom Bryant" as an entity of type PERSON, by utilisation of Rule 5. In response to finding the entity, the parser (105) stores (step 210) data associated with the entity in the entity table (145). A representation of the entity table is shown below.

Entity Table:

| RULE ID | ENTITY TYPE | ENTITY | DOCUMENT ID | LOCA-TION | LENGTH |
|---|---|---|---|---|---|
| R1 | PERSON | Joe Bloggs | 12345 | 10,125 | 10 |
| R2 | ORGANI-SATION | IBM | 23456 | 5,2345 | 3 |
| R2 | ORGANI-SATION | ACME CORP | 12345 | 11,342 | 9 |
| R3 | PLACE | London | 234 | 35 | 6 |
| R4 | PERSON | John Smith | 2345 | 1,234 | 10 |
| R5 | PERSON | Joe Bloggs | 12345 | 9,527 | 10 |
| R5 | PERSON | Tom Bryant | 9999 | 248 | 10 |

The parser (105) makes (step 215) a determination that there is not another rule in the rule base (115) and the process ends.

Figure 3B:
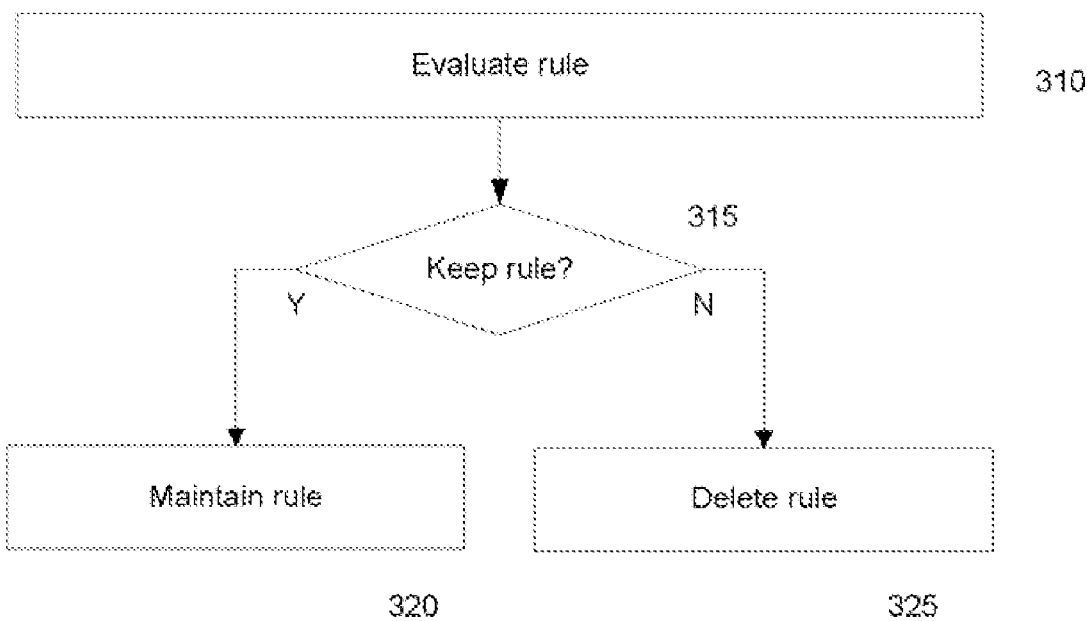
FIG. 3B is flow chart showing the operational steps involved in processes executed by an evaluator and a selector.

With reference to FIG. 3B in response to the re-execution of the parser (105), the evaluator evaluates (step 310) the new rule. In the first example, the condition threshold is "1". Rule 5 meets the condition threshold, that is, Rule 5 satisfies one condition. Specifically, Rule 5 satisfies three conditions. Namely, Condition 1, since Rule 5 identifies a plurality of entities (i.e. "Joe Bloggs" and "Tom Bryant"); Condition 2, since Rule 5 is supported by Rule 1 that specifies "Joe Bloggs" as a person entity type and Condition 3, since Rule 5 is not in conflict with any other rule that identifies "Joe Bloggs" and "Tom Bryant" as another entity type. Thus, Rule 5 is selected by the selector and is maintained (step 320) in the rule base (115).

In response to the evaluation, with reference to FIG. 2B, a further occurrence of the entity "Tom Bryant" is not found and the process ends.

Thus, advantageously, the present invention allows for further occurrences of entities with different associated contexts to be found. Furthermore, the present invention allows for the generation of new rules to identify entities of an entity type.

The invention claimed is:

1. A system for modifying a rule base for use in processing data, comprising:
at least one electronic circuit configured to
access said rule base to obtain a first rule that identifies an occurrence of an entity, said first rule comprising a first sub-portion of text contained in a document set that is different than and is associated with said entity,
compare said first rule against data of said document set for identifying a first instance of said entity in said document set,
compare first entity data associated with said first instance of said entity against data of a text index for said document set to identify a second instance of the entity in said document set that was not identified using said first rule,
determine whether the entity is frequently identified as being of a particular entity type,
access a data store to obtain second entity data that is associated with the second instance of the entity if it is determined that the entity is frequently identified as being of the particular entity type,
utilize said second entity data to extract a second sub-portion of text that is different than and associated with said second instance of said entity from said document set, and
use said second sub-portion of text to generate a second rule.

2. A system as claimed in claim 1, wherein the second instance of the entity matches the first instance of the entity.

3. A system as claimed in claim 1, wherein the second instance of the entity substantially matches the first instance of the entity.

4. A system as claimed in claim 1, wherein the second entity data associated with the second instance of the entity comprises at least one of: an entity type; a document identifier associated with a document in which the second instance of the entity was identified; a location identifier associated with a location in the document at which the second instance of the entity was identified; and a length value associated with a length of the entity.

5. A system as claimed in claim 1, wherein the electronic circuit is further configured to extract a set of symbols from a document identified by the second entity data.

6. A system as claimed in claim 5, wherein the second rule is generated using the set of symbols.

7. A system as claimed in claim 1, wherein the electronic circuit is further configured for evaluating an efficiency of at least the second rule using information associated with at least one instance of the entity.

8. A system as claimed in claim 1, wherein the electronic circuit is further configured for evaluating an efficiency of at least the second rule using information associated with at least one other rule.

9. A system as claimed in claim 1, wherein the electronic circuit is further configured for evaluating an efficiency of at least the second rule using information associated with a plurality of other rules.

10. A system as claimed in claim 1, wherein the electronic circuit is further configured for determining whether the second rule satisfies at least one pre-defined condition.

11. A system as claimed in claim 10, wherein the electronic circuit is further configured for selecting the second rule, in response to a determination that the second rule satisfies the pre-defined condition.

12. A system as claimed in claim 10, wherein the electronic circuit is further configured for ranking the second rule, in response to a determination that the second rule satisfies the pre-defined condition.

13. A method for modifying a rule base for use in processing data, comprising:
accessing, by an electronic circuit, said rule base to obtain a first rule that identifies an occurrence of an entity, said first rule comprising a first sub-portion of text contained in a document set that is different than and is associated with said entity;
comparing, by the electronic circuit, said first rule against data of said document set for identifying a first instance of said entity in said document set;
comparing, by the electronic circuit, first entity data associated with said first instance of the entity against data of a text index for said document set to identify a second instance of the entity in said document set that was not identified using said first rule;
determining, by the electronic circuit, whether the entity is frequently identified as being of a particular entity type;
accessing, by the electronic circuit, a data store to obtain second entity data that is associated with the second instance of the entity if it is determined that the entity is frequently identified as being of the particular entity type;
utilizing, by the electronic circuit, said second entity data to extract a second sub-portion of text that is different than and associated with said second instance of said entity from said document set; and
using, by the electronic circuit, the second sub-portion of text to generate a second rule.

14. A method as claimed in claim 13, wherein the second instance of the entity matches the first instance of the entity.

15. A method as claimed in claim 13, wherein the second instance of the entity substantially matches the first instance of the entity.

16. A method as claimed in claim 13, wherein the second entity data associated with the second instance of the entity comprises at least one of: an entity type; a document identifier associated with a document in which the second instance of the entity was identified; a location identifier associated with a location in the document at which the second instance of the entity was identified; and a length value associated with a length of the entity.

17. A method as claimed in claim 13, further comprising the step of: using, by the electronic circuit, the second entity data to extract a set of symbols from a document identified by the second entity data.

18. A method as claimed in claim 17, wherein the second rule is generated using the set of symbols.

19. A method as claimed in claim 13, further comprising the step of: evaluating, by the electronic circuit, an efficiency of at least the second rule using information associated with at least one instance of the entity.

20. A method as claimed in claim 13, further comprising the step of: evaluating, by the electronic circuit, an efficiency of at least the second rule using information associated with at least one other rule.

21. A method as claimed in claim 13, further comprising the step of: evaluating, by the electronic circuit, an efficiency of at least the second rule using information associated with a plurality of other rules.

22. A method as claimed in claim 19, further comprising the step of: determining whether the second rule satisfies at least one pre-defined condition.

23. A method as claimed in claim 22, further comprising the step of: selecting, by the electronic circuit, the second rule in response to a determination that the second rule satisfies the pre-defined condition.

24. A method as claimed in claim 22, further comprising the step of: ranking, by the electronic circuit, the second rule in response to a determination that the second rule satisfies the pre-defined condition.

25. A non-transitory computer-readable storage medium having stored thereon a computer program for modifying a rule base for use in processing data, the computer program executable by a computer to cause the computer to perform the steps of:
  accessing said rule base to obtain a first rule that identifies an occurrence of an entity, said first rule comprising a first sub-portion of text contained in a document set that is different than and is associated with said entity,
  comparing said first rule against data of said document set for identifying a first instance of said entity in said document set,
  comparing first entity data associated with said first instance of the entity against data of a text index for said document set to identify a second instance of the entity in said document set that was not identified using said first rule,
  determining whether the entity is frequently identified as being of a particular entity type;
  accessing a data store to obtain second entity data that is associated with the second instance of the entity if it is determined that the entity is frequently identified as being of a particular entity type;
  utilizing said second entity data to extract a second sub-portion of text that is different than and associated with said second instance of said entity from said document set; and
  using said second sub-portion of text to generate a second rule.

26. The non-transitory computer-readable storage medium as claimed in claim 25, wherein the second instance of the entity matches the first instance of the entity.

27. The non-transitory computer-readable storage medium as claimed in claim 25, wherein the second instance of the entity substantially matches the first instance of the entity.

28. The non-transitory computer-readable storage medium as claimed in claim 25, wherein the second entity data comprises at least one of: an entity type; a document identifier associated with a document in which the second instance of the entity was identified; a location identifier associated with a location in the document at which the second instance of the entity was identified; and a length value associated with a length of the entity.

29. The non-transitory computer-readable storage medium as claimed in claim 25, wherein the computer is further caused to extract a set of symbols from a document identified by the second entity data.

30. The non-transitory computer-readable storage medium as claimed in claim 29, wherein the second rule is generated using the set of symbols.

31. The non-transitory computer-readable storage medium as claimed in claim 25, wherein the computer is further caused to evaluate an efficiency of at least the second rule using information associated with at least one instance of the entity.

32. The non-transitory computer-readable storage medium as claimed in claim 25, wherein the computer is further caused to evaluate an efficiency of at least the second rule using information associated with at least one other rule.

33. The non-transitory computer-readable storage medium as claimed in claim 25, wherein the computer is further caused to evaluate an efficiency of at least the second rule using information associated with a plurality of other rules.

34. The non-transitory computer-readable storage medium as claimed in claim in any of claim 25, wherein the computer is further caused to determine whether the second rule satisfies at least one pre-defined condition.

35. The non-transitory computer-readable storage medium as claimed in claim 34, wherein the computer is further caused to select the second rule in response to a determination that the second rule satisfies the pre-defined condition.

36. The non-transitory computer-readable storage medium as claimed in claim 34, wherein the computer is further caused to rank the second rule in response to a determination that the second rule satisfies the pre-defined condition.

37. A method for providing a service to a customer over a network, for modifying a rule base for use in processing data, said method comprising:
  accessing, by an electronic circuit, said rule base to obtain a first rule that identifies an occurrence of an entity, said first rule comprising a first sub-portion of text contained in a document set that is different than and is associated with said entity,
  comparing, by the electronic circuit, said first rule against data of said document set for identifying a first instance of said entity in said document set;
  comparing, by the electronic circuit, first entity data associated with the first instance of the entity against data of a text index for said document set to identify a second instance of the entity in the document set that was not identified using said first rule;
  determining, by an electronic circuit, whether the entity is frequently identified as being of a particular type;
  accessing, by the electronic circuit, a data store to obtain second entity data that is associated with the second instance of the entity in response to a determination that the second data is frequently identified as being of a particular type;
  utilizing, by the electronic circuit, said second entity data to extract a second sub-portion of text that is different than and associated with said second instance of said entity from said document set; and
  using, by the electronic circuit, the second sub-portion of text to generate a second rule.

* * * * *